(12) United States Patent
Jamadagni et al.

(10) Patent No.: US 9,807,649 B2
(45) Date of Patent: Oct. 31, 2017

(54) PACKET SWITCHED SERVICES IN A GERAN ENVIRONMENT

(71) Applicant: Samsung Electronics Co., Ltd., Gyeonggi-do (KR)

(72) Inventors: Satish Jamadagni, Bangalore (IN); Pradeep Krishnamurthy Hirisave, Bangalore (IN); Sarvesha Anegundi Ganapathi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 228 days.

(21) Appl. No.: 14/353,000

(22) PCT Filed: Oct. 18, 2012

(86) PCT No.: PCT/KR2012/008552
§ 371 (c)(1),
(2) Date: Apr. 18, 2014

(87) PCT Pub. No.: WO2013/058576
PCT Pub. Date: Apr. 25, 2013

(65) Prior Publication Data
US 2014/0286282 A1    Sep. 25, 2014

(30) Foreign Application Priority Data
Oct. 20, 2011  (IN) ............... 3611/CHE/2011

(51) Int. Cl.
*H04W 36/00*  (2009.01)
*H04W 48/10*  (2009.01)

(52) U.S. Cl.
CPC ....... *H04W 36/0022* (2013.01); *H04W 48/10* (2013.01)

(58) Field of Classification Search
CPC ... H04W 8/24; H04W 48/10; H04W 36/0022; H04M 3/42017
USPC .......................................... 370/329; 455/436
See application file for complete search history.

(56) References Cited

U.S. PATENT DOCUMENTS

| | | | |
|---|---|---|---|
| 2007/0224990 A1* | 9/2007 | Edge | H04W 8/24 455/436 |
| 2010/0080149 A1* | 4/2010 | Lee | H04M 3/42017 370/259 |
| 2010/0290433 A1* | 11/2010 | Stojanovski | H04W 36/0022 370/331 |

(Continued)

OTHER PUBLICATIONS

International Search Report dated Mar. 28, 2013 in connection with International Patent Application No. PCT/KR2012/008552, 3 pages.

(Continued)

*Primary Examiner* — Jianye Wu (57) ABSTRACT

The present invention provides a method and system for indicating packet switched (PS) services capability information in a GPRS EDGE Radio Access Network (GERAN) environment. When a GERAN provides PS only services on a GERAN terminal, the GERAN terminal indicates its capability to support PS only services to a GERAN entity. Accordingly, the GERAN entity can deliver PS services data to the GERAN terminal operating a PS only mode over resources suitable for PS data communication.

18 Claims, 10 Drawing Sheets

(56) References Cited

U.S. PATENT DOCUMENTS

2014/0219182 A1* 8/2014 Chandramouli ...... H04W 4/005
370/328

OTHER PUBLICATIONS

Written Opinion of International Searching Authority dated Mar. 28, 2013 in connection with International Patent Application No. PCT/KR2012/008552, 4 pages.
Samsung, "PS-Only MTC Feature Control", SA WG2 Meeting #87, S2-114109, Oct. 10-14, 2011, 4 pages.
Huawei et al., "Enabling SMS for PS-only", SA WG2 Meeting #87, S2-114186, Oct. 10-14, 2011, 7 pages.
Vodafone, "PS domain only: Inhibiting CS domain except for SMS over SGs", SA WG2 Meeting #87, S2-114349, Oct. 10-14, 2011, 5 pages.
LG Electronics, "Optimized architecture for SMS over SGs (or "Native SMS for LTE" revisited)", SA WG2 Meeting #87, S2-114374, Oct. 10-14, 2011, 5 pages.

* cited by examiner

PACKET SWITCHED SERVICES IN A GERAN ENVIRONMENT

CROSS-REFERENCE TO RELATED APPLICATION(S)

The present application claims priority under 35 U.S.C. §365 to International Patent Application No. PCT/KR2012/008552 filed Oct. 18, 2012, entitled "PACKET SWITCHED SERVICES IN A GERAN ENVIRONMENT". International Patent Application No. PCT/KR2012/008552 claims priority under 35 U.S.C. §365 and/or 35 U.S.C. §119(a) to Korean Patent Application No. 3611/CHE/2011 filed Oct. 20, 2011 and which are incorporated herein by reference into the present disclosure as if fully set forth herein.

TECHNICAL FIELD

The present invention generally relates to the field of GPRS EDGE Radio Access Network (GERAN) systems, and more particularly relates to providing only packet switched services in a GERAN environment.

BACKGROUND ART

In the 3GPP GERAN forums, there is treatise to support Packet Switched (PS) services only feature, i.e., there will be no circuit switched services supported in a GERAN terminal and a network entity. When designing GERAN terminals or networks to support only PS services, the network may also need to know whether the GERAN terminal is capable of supporting PS only services.

DISCLOSURE OF INVENTION

Technical Problem

According to the GERAN specification, in the Iu mode, the "Packet Control Ack" or "Packet Downlink Dummy Control Block" which facilitates PS calls can go over control channels such as Fast Associated Control Channel (FACCH), Slow Associated Control Channel (SACCH) and Stand alone Dedicated Control Channel (SDCCH) typically meant for circuit switched services. However, a GERAN terminal with PS only capabilities may not support FACCH, SACCH, SDCCH, resulting in communication failure.

Solution to Problem

The prevent invention provides a method for providing only Packet Switched (PS) services in a GSM EDGE Radio Access Network (GERAN) environment. The method comprises of indicating capability of a GERAN terminal to support only packet switched (PS) services to a GERAN entity in the GERAN environment, and receiving PS only services data from the GERAN entity over resources suitable for PS data communication based on the capability indication.

The drawings described herein are for illustration purposes only and are not intended to limit the scope of the present disclosure in any way.

MODE FOR THE INVENTION

The present invention provides a method and system for indicating packet switched services capability information in a GPRS EDGE Radio Access Network (GERAN) environment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

In the document, the term 'GERAN entity' generally refers to one of core network entity or access network entity based on the context.

Figure 1:
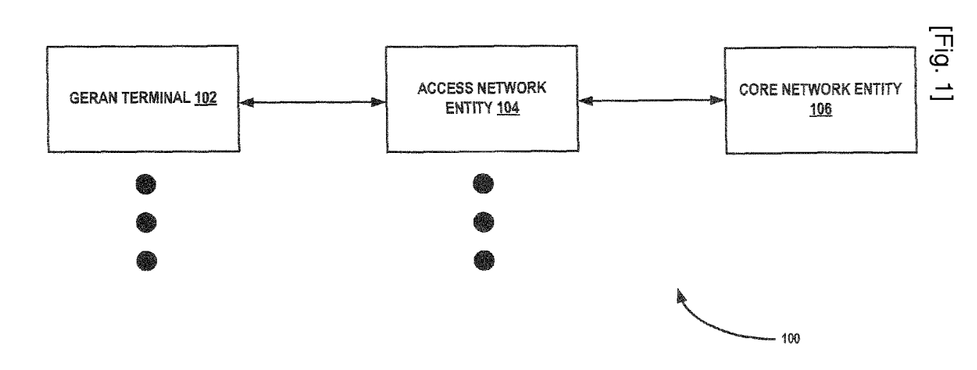
FIG. 1 is a block diagram illustrating an exemplary GPRS EDGE Radio Access Network (GERAN) environment, according to one embodiment.

FIG. 1 is a block diagram illustrating an exemplary GERAN environment 100, according to one embodiment. In FIG. 1, the GERAN environment 100 includes a GERAN terminal 102, an access network entity 104 and a core network entity 106. The GERAN terminal 102 may be a mobile phone, smart phone, tablet PC, personal digital assistant and like devices capable of supporting only Packet Switched mode. The access network entity may be a base station or other network entity in the GERAN for facilitating the GERAN terminal to operate in the PS only mode.

When the GERAN provides PS only services on the GERAN terminal 102, the GERAN terminal 102 indicates its capability to support PS only services to the access network entity 104 or the core network entity 106. Accordingly, the access network entity 104 can deliver PS services data to the GERAN terminal 102 operating a PS only mode over resources (e.g., PDTCH and PACCH) dedicated for PS data communication.

Figure 2A:
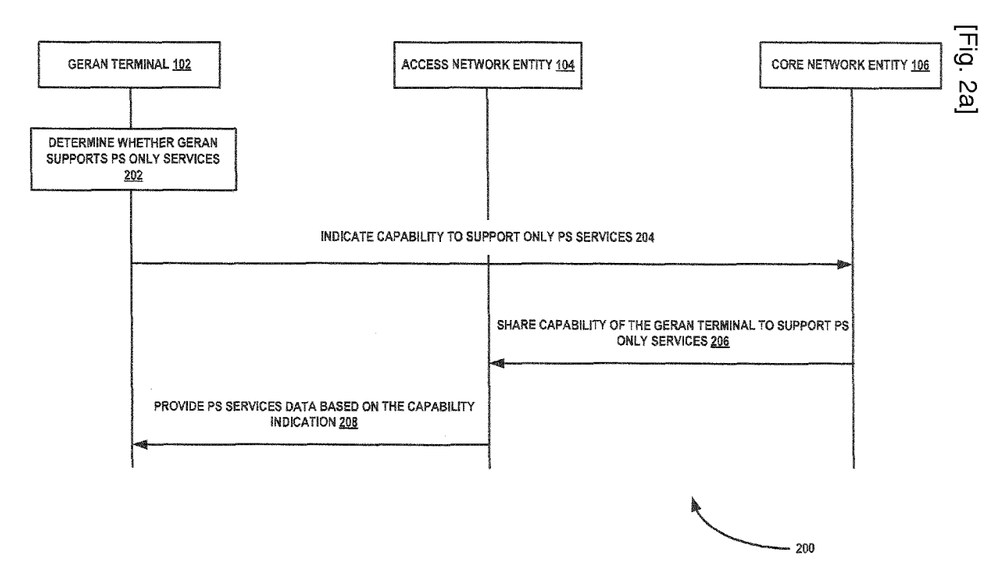
FIG. 2a is a process flow diagram illustrating an exemplary method of indicating a capability to operate in a Packet Switched (PS) only mode to a core network entity, according to one embodiment.

FIG. 2a is a process flow diagram 200 illustrating an exemplary method of indicating a PS only capability to a core network entity 106, according to one embodiment. Consider that the GERAN terminal 102 supports PS services and does not support CS services. In such case, the GERAN terminal 102 determines whether the core network entity 106 supports PS only services, at step 202. The core network entity 106 may indicate its capability to support PS only capabilities in system information (SI) messages. For example, the core network entity 106 may indicate the capability to support PS only services in system information type 13 (SI13) messages.

Figure 6:
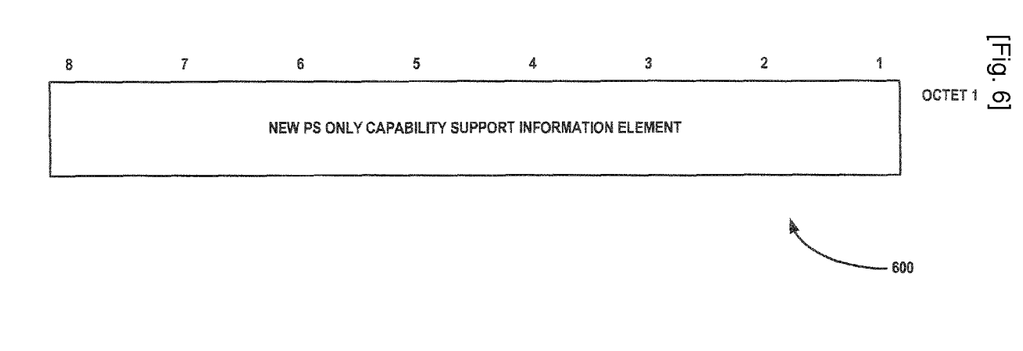
FIG. 6 is a schematic representation of an exemplary PS capability support information element, according to one embodiment.

In one embodiment, the SI13 message may include a PS only capability support information element which indicates whether the core network entity 106 supports the PS only services or not. Exemplary PS only capability support information element 600 is shown in FIG. 6. An SI13 message with a PS only capability support information element for indicating capability of the core network entity 106 to support PS only services is shown in Table 1.

TABLE 1

| Information element | Type/Reference | IEI Presence | Format | length |
|---|---|---|---|---|
| L2 Pseudo Length | L2 Pseudo Length 10.5.2.19 | M | V | 1 |
| RR management Protocol Discriminator | Protocol Discriminator 10.2 | M | V | ½ |
| Skip Indicator | Skip Indicator 10.3.1 | M | V | ½ |
| System Information Type 13 Message Type | Message Type 10.4 | M | V | 1 |
| SI 13 Rest Octets | SI 13 Rest Octets 10.5.2.37b | M | V | 20 |
| PS only capability Support | Xxx | O | TV | 1 |

In another embodiment, the core network entity 106 may indicate whether it supports PS only services in GPRS cell options of the SI13 message. Exemplary schema of GPRS cell options in the SI13 message to indicate capability of the core network entity 106 to support PS only services is shown in Table 2.

TABLE 2

```
< GPRS Cell Options IE > ::=
    < NMO : bit (2) >
    < T3168 : bit (3) >
    < T3192 : bit (3) >
    < DRX_TIMER_MAX : bit (3) >
    < ACCESS_BURST_TYPE : bit >
    < CONTROL_ACK_TYPE : bit >
    < BS_CV_MAX : bit (4) >
    { 0 | 1   <PAN_DEC : bit (3) >
              < PAN_INC : bit (3) >
              < PAN_MAX : bit (3) > }
    -- Optional extension information:
    { 0 | 1   <Extension Length : bit (6)>
              < bit (val(Extension Length) + 1)
              & { <Extension Information > ! { bit ** = <no string> } } > } ;
< Extension Information> : : =
    { {      -- R99 extension:
             {0 | 1 - EGPRS supported by the cell if the choice bit is set to '1'
                     < EGPRS_PACKET_CHANNEL_REQUEST : bit >
                     < BEP_PERIOD : bit (4) > }
             < PFC_FEATURE_MODE: bit >
             < DTM_SUPPORT: bit >
             < BSS_PAGING_COORDINATION: bit > }
    {        -- REL-4 extension:
             < CCN_ACTIVE : bit >
             < NW_EXT_UTBF : bit > }
    {        -- REL 6 extension:
             < MULTIPLE_TBF_CAPABILITY : bit >
             < EXT_UTBF_NODATA : bit >
             < DTM_ENHANCEMENTS_CAPABILITY : bit >
             { 0         -- MBMS procedures not supported by the cell if the choice bit is set to '0'
             | 1         -- MBMS procedures supported by the cell if the choice bit is set to '1'
                     < DEDICATED_MODE_MBMS_NOTIFICATION_SUPPORT: bit >
                     < MNCI_SUPPORT : bit > } }
    {        -- Rel-7 extension:
             < REDUCED_LATENCY_ACCESS : bit > }
    <PS-ONLY Capability: bit>
< spare bit > ** } // ; -- Extension information may be truncated between released versions of the protocol.
             -- The receiver shall assume the value zero for any truncated bit.
```

If the core network entity 106 supports PS only services, then at step 204, the GERAN terminal 102 indicates capability to support PS only services to the core network entity 106. It can be noted that, the GERAN terminal 102 sends the indication to the core network entity 106 as the core network entity 104 needs to manage paging coordination and other signalling procedures. In one embodiment, the GERAN terminal 102 may indicate capability to support PS only services to the core network entity 106 in an access request message or a routing area update request message. In one exemplary implementation, the GERAN transmits the access request message or the routing area update request message which indicates the PS only services capability during a network attach procedure or a routing area update procedure respectively.

Figure 3A:
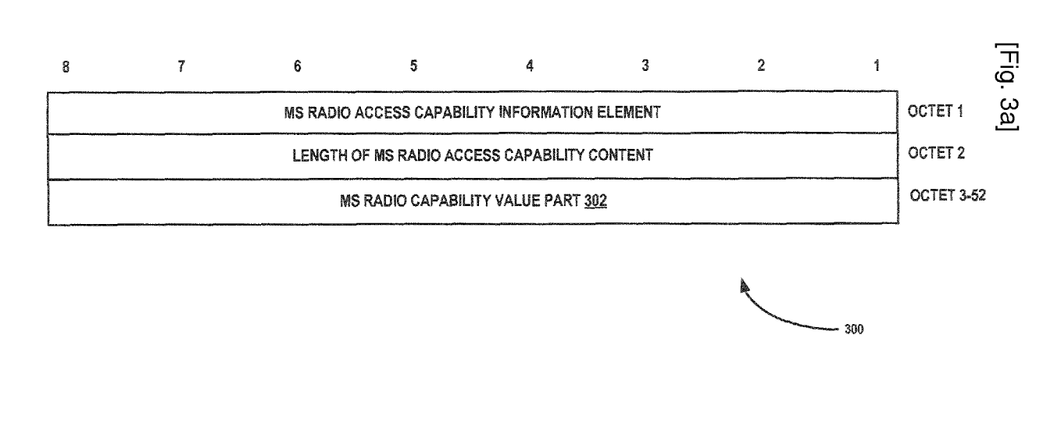
FIG. 3a is a schematic representation of an exemplary MS radio access capability information element indicating PS only capability, according to one embodiment.

For example, the GERAN terminal 102 may indicate capability to support PS only services in a MS radio access capability information element of an attach request message, or a routing area update request. Referring to FIG. 3*a*, a MS radio access capability information element 300 contains one bit indicator 302 indicating capability to support PS only services to the core network 106. The GERAN terminal 102 indicates the capability to support PS only services by setting the one bit indicator to a value '1' when the GERAN terminal 102 supports PS only services. Exemplary schema of the MS radio access capability information element is given in Tables 3 to 5.

TABLE 3

```
< MS RA capability value part > ::=
    < MS RA capability value part struct >
    <spare bits>**; -- may be used for future enhancements
<MS RA capability value part struct >::= --recursive structure allows any number of
Access technologies
    {           {   < Access Technology Type: bit (4) > exclude 1111
                    < Access capabilities : <Access capabilities struct> > }
    |           {   < Access Technology Type: bit (4) == 1111 > -- structure
adding Access technologies with same capabilities
                    < Length : bit (7) >        -- length in bits of list of Additional
access technologies and spare bits
                    { 1 < Additional access technologies: < Additional access
technologies struct > > } ** 0
                    <spare bits>** } }
    { 0 | 1 <MS RA capability value part struct> } ;
< Additional access technologies struct > ::=
    < Access Technology Type: bit (4) >
    < GMSK Power Class : bit (3) >
    < 8PSK Power Class : bit (2) > ;
< Access capabilities struct > ::=
    < Length : bit (7) > -- length in bits of Content and spare bits
    <Access capabilities : <Content>>
    <spare bits>** ; -- expands to the indicated length
                    -- may be used for future enhancements
< Content > ::=
    < RF Power Capability : bit (3) >
    { 0 | 1 <A5 bits : <A5 bits> > }   -- zero means that the same values apply
for parameters as in the immediately preceding Access capabilities field within this IE
    < ES IND : bit >
    < PS : bit >
    < VGCS : bit >
    < VBS : bit >
    { 0 | 1 < Multislot capability : Multislot capability struct > } zero means that
the same values for multislot parameters as given in an earlier Access capabilities
field within this IE apply also here
-- Additions in release 99
    { 0 | 1 < 8PSK Power Capability : bit(2) >}
    < COMPACT Interference Measurement Capability : bit >
    < Revision Level Indicator : bit >
    < UMTS FDD Radio Access Technology Capability : bit >
    -- 3G RAT
```

TABLE 4

```
    < UMTS 3.84 Mcps TDD Radio Access Technology Capability : bit >  --
3G RAT
    < CDMA 2000 Radio Access Technology Capability : bit >
            -- 3G RAT
-- Additions in release 4
    < UMTS 1.28 Mcps TDD Radio Access Technology Capability: bit >  --
3G RAT
    < GERAN Feature Package 1 : bit >
    { 0 | 1 < Extended DTM GPRS Multi Slot Class : bit(2) >
            < Extended DTM EGPRS Multi Slot Class : bit(2) > }
    < Modulation based multislot class support : bit >
-- Additions in release 5
    { 0 | 1 < High Multislot Capability : bit(2) > }
    { 0 | 1 < GERAN Iu Mode Capabilities > }
```

TABLE 4-continued

```
    < GMSK Multislot Power Profile : bit (2) >
    < 8-PSK Multislot Power Profile : bit (2) >
-- Additions in release 6
    < Multiple TBF Capability : bit >
    < Downlink Advanced Receiver Performance : bit(2) >
    < Extended RLC/MAC Control Message Segmentation Capability : bit >
    < DTM Enhancements Capability : bit >
    { 0 | 1 < DTM GPRS High Multi Slot Class : bit(3) >
            { 0 | 1 < DTM EGPRS High Multi Slot Class : bit(3) > } }
    < PS Handover Capability : bit >
-- Additions in release 7
    < DTM Handover Capability : bit >
    { 0 | 1 < Multislot Capability Reduction for Downlink Dual Carrier: bit (3) >
            < Downlink Dual Carrier for DTM Capability : bit> }
    < Flexible Timeslot Assignment : bit >
    < GAN PS Handover Capability : bit >
    < RLC Non-persistent Mode : bit >
    < Reduced Latency Capability : bit >
    < Uplink EGPRS2 : bit(2) >
    < Downlink EGPRS2 : bit(2) >
-- Additions in release 8
    < E-UTRA FDD support : bit >
    < E-UTRA TDD support : bit >
    < GERAN to E-UTRA support in GERAN packet transfer mode: bit(2) >
    < Priority-based reselection support : bit >
-- Additions in release 9
    < Enhanced Flexible Timeslot Assignment : Enhanced Flexible Timeslot
Assignment struct>
    < Indication of Upper Layer PDU Start Capability for RLC UM : bit >
    < EMST Capability : bit >
    < MTTI Capability : bit >
    < UTRA CSG Cells Reporting : bit >
    < E-UTRA CSG Cells Reporting : bit >
-- Additions in release 10
    < DTR Capability : bit >
    < EMSR Capability : bit >
```

TABLE 5

```
    < Fast Downlink Frequency Switching Capability : bit >
    < TIGHTER Capability : bit(2) >;
    -- Additions in release xx
        <PS-ONLY Capability: bit>
        -- error: struct too short, assume features do not exist
        -- error: struct too long, ignore data and jump to next Access
    technology
```

Figure 3B:
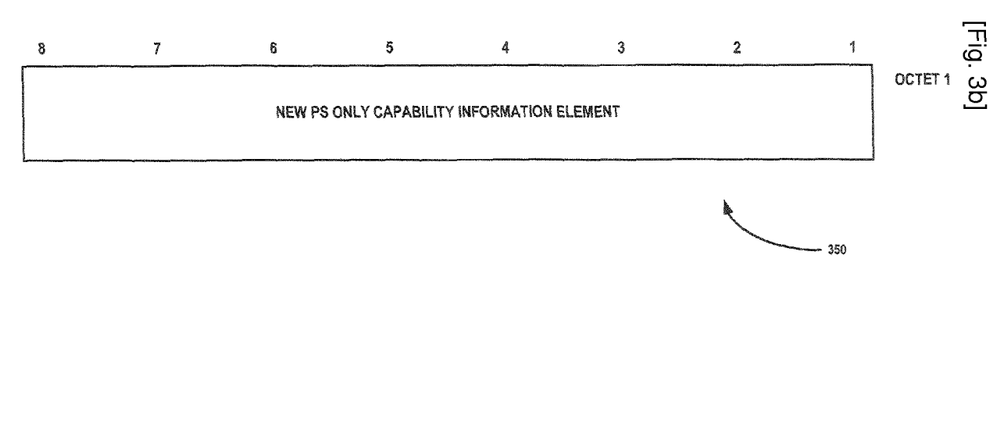
FIG. 3b is a schematic representation of an exemplary new dedicated information element indicating PS only capability, according to another embodiment.

Alternatively, an attach request message or a routing area update message may contain a new dedicated information element for indicating capability to support PS only services to the core network 106. Exemplary new dedicated information element 350 for indicating capability to support PS only services is shown in FIG. 3*b*.

Figure 4:
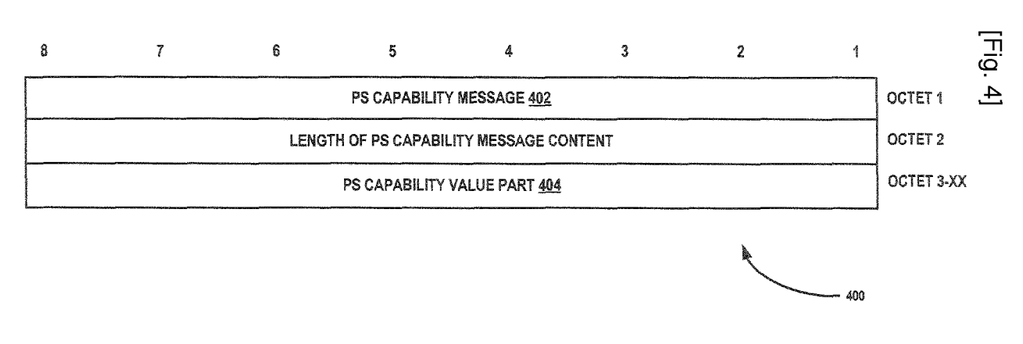
FIG. 4 is a schematic representation of an exemplary new dedicated message indicating PS only capability information, according to yet another embodiment.

In another embodiment, the GERAN terminal 102 indicates capability to support PS only services to the core network entity 106 in a new message. The new message also carries PS related capability information such as power class profile, modulation/coding schemes, etc. The GERAN terminal 102 may transmit the new PS capability message indicating capability to support PS only services to the core network entity 106 upon a network attach procedure. Alternatively, the GERAN terminal may transmit the new PS capability message indicating capability to support PS only services upon receiving a request for capability exchange from the core network entity 106. Exemplary format of the new PS capability message 400 with a PS capability message 402 for carrying PS capability information and one bit indicator 404 for indicating PS only capability is illustrated in FIG. 4.

Upon communicating the capabilities to the core network entity 106, at step 206, the core network entity 106 shares the capability of the GERAN terminal 102 to support PS only services to the access network entity 104. At step 208, the access network entity 104 transmits PS only services data over resources (e.g., PDTCH and PACCH) meant for PS data communication. For example, the access network entity 106 schedules the "Packet Control Acknowledgement" and "Packet Downlink Dummy Control Block" messages over a PACCH signalling channel and not over a SDCCH since the GERAN terminal 102 supports only PS mode.

Figure 2B:
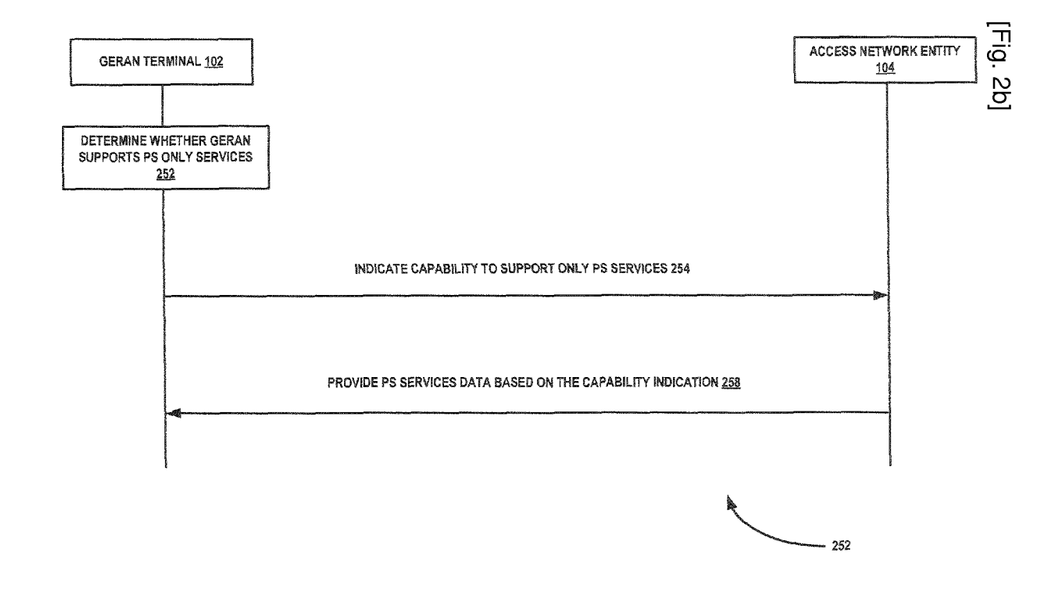
FIG. 2b is a flow diagram illustrating an exemplary method of indicating a capability to operate in a PS only mode to an access network entity, according to another embodiment.

FIG. 2*b* is a flow diagram illustrating an exemplary method of indicating a PS only capability to the access network entity 104, according to another embodiment. Consider that the GERAN terminal 102 supports PS services and does not support CS services. In such case, the GERAN terminal 102 determines whether the access network entity 104 (e.g., a base station) supports PS only services, at step 252. The access network entity 104 may indicate its capability to support PS only capabilities in system information (SI) messages. For example, the access network entity 104 may indicate the capability to support PS only services in system information type 13 message.

In one embodiment, the system information type 13 message may include a PS only capability support information element which indicates whether the access network entity 104 supports the PS only services or not. Exemplary PS only capability support information element 600 is shown in FIG. 6. A system information type 13 message with a PS only capability support information element for indicating capability of the access network entity entity 104 to support PS only services is shown in Table 1. In another embodiment, the access network entity 104 may indicate whether it supports PS only services in GPRS cell options Information Element (IE) in the system information type 13 message. Exemplary schema of GPRS cell options information element in the system information type 13 message to indicate capability of the access network entity 104 to support PS only services is shown in Table 2.

If the access network entity 104 supports PS only services, then at step 254, the GERAN terminal 102 indicates capability to support PS only services to the access network entity 104. It can be noted that, the GERAN terminal 102 sends the indication to the access network entity 104 as the access network entity supports paging coordination. In one embodiment, the GERAN terminal 102 indicates capability to support PS only services to the access network entity 104 in a packet resource request message. In one instance, the GERAN terminal 102 may indicate capability to support PS only services in a MS radio access capability information element of a packet resource request message. An exemplary MS radio access capability information element 300 with one bit indicator 302 to indicate capability to support PS only services is depicted in FIG. 3a.

Figure 5A:
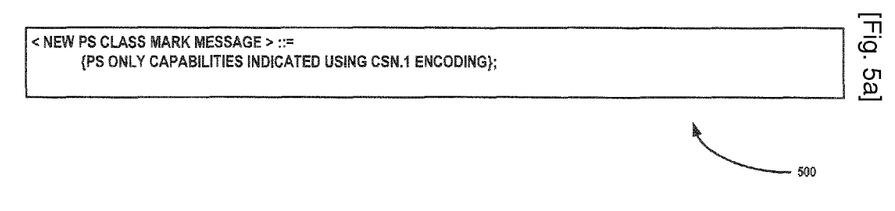
FIG. 5a is a schematic representation of an exemplary PS mode class mark message indicating PS only capability information, according to one embodiment.

In another embodiment, the GERAN terminal 102 indicates capability to support PS only services to the access network entity 104 in a PS mode class mark message. Exemplary PS mode class mark message 500 for indicating capability to support PS only services is illustrated in FIG. 5a. In some embodiments, the GERAN terminal 102 transmits the PS class mark message via a two phase access procedure as will be described in description of FIG. 5b.

At step 256, the access network entity 104 transmits PS only services data over resources (e.g., PDTCH and PACCH) meant for PS data communication based on the capability indication. For example, the access network entity 104 schedules the "Packet Control Acknowledgement" and "Packet Downlink Dummy Control Block" messages over a PACCH signalling channel and not over a SDCCH since the GERAN terminal 102 supports only PS mode.

Figure 5B:
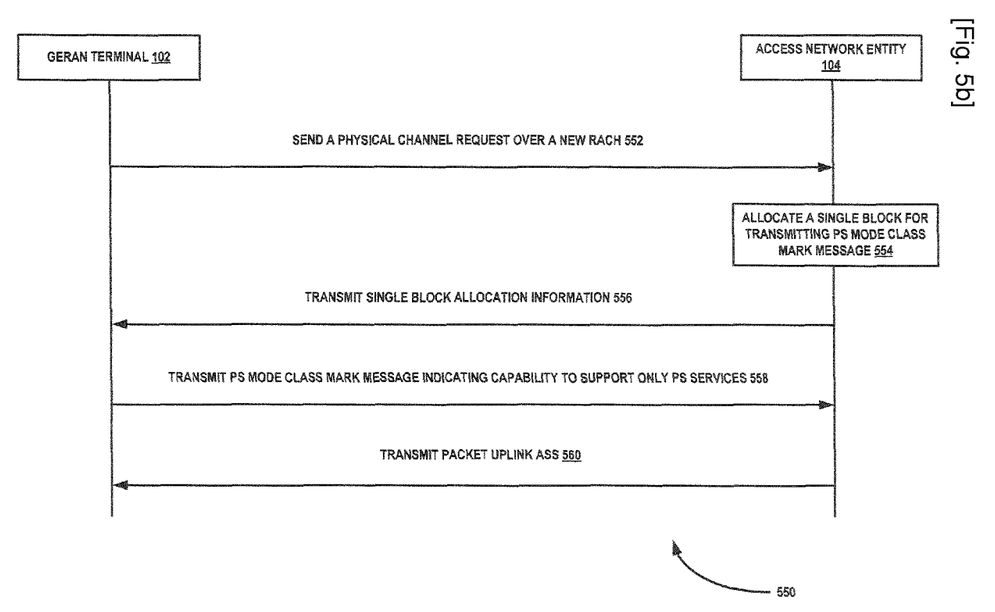
FIG. 5b is a flow diagram 550 illustrating an exemplary method of a two phase access procedure for transmitting a PS mode class mark message, according to one embodiment.

FIG. 5b is a flow diagram 550 illustrating an exemplary method of a two phase access procedure for transmitting a PS mode class mark message, according to one embodiment. When the GERAN terminal 102 wishes to indicate a PS capability to the access network entity 104 using a PS mode class mark message, steps 552 to 558 are performed. At step 552, the GERAN terminal 102 sends a packet channel request message to the access network entity 104 over a new random access channel. The packet channel request sent over the new random access channel indicates the access network entity to trigger a two phase access procedure. Exemplary packet channel request formats are illustrated in Table 6, Table 7 and Table 8.

TABLE 6

```
< Packet channel request 11 bit message content > ::=
    < One Phase Access Request :      0        < MultislotClass : bit (5) >
        < Priority : bit (2) >
        < RandomBits : bit (3) > >
    | < Short Access Request :           100       -- The value 100 was allocated in an earlier version of the
protocol and shall not be used by the mobile station
        < NumberOfBlocks : bit (3) >
        < Priority : bit (2) >
        < RandomBits : bit (3) > >
    | < Two Phase Access Request :     110000    < Priority : bit (2) >
        < RandomBits : bit (3) > >
    | < Page Response :         110001    < RandomBits : bit (5) > >
    | < Cell Update : 110010   < RandomBits: bit (5) > >
    | < MM Procedure :         110011    < RandomBits : bit (5) > >
    | < Single Block Without TBF Establishment:    110100 < RandomBits : bit (5) > >
    | < One Phase Access Request in RLC unack mode : 110101 < RandomBits : bit (5) > >
    | < Dedicated channel request :        110110     < Random Bits : bit (5) > >
    | < Emergency call :         110111    < RandomBits : bit (5) > >
    | < Single block MBMS access :     111000    < RandomBits : bit (5) > > ;
    | < New Rach Type for PS Only capability : xxxxxx < RandomBits : bit(5) > >;
```

TABLE 7

```
< Packet channel request 8 bit message content > ::=
    < One Phase Access Request :      1        < MultislotClass : bit (5) >
        < Random Bits : bit (2) > >
    | < Short Access Request :           00        -- The value 00 was allocated in an earlier version of the
protocol and shall not be used by the mobile station
        < NumberOfBlocks : bit (3) >
        < RandomBits : bit (3) > >
    | < Two Phase Access Request :     01000    < RandomBits : bit (3) > >
    | < Page Response :         01001    < RandomBits : bit (3) > >
    | < Cell Update : 01010   < Random Bits : bit (3) > >
    | < MM Procedure :         01011    < RandomBits : bit (3) > >
    | < Single Block Without TBF Establishment :   01100    < RandomBits : bit (3) > >
    | < One phase Access Request in RLC unack mode : 011010 < RandomBits : bit (2) > >
    | < Dedicated channel request :        011011     < RandomBits : bit (2) > >
    | < Emergency call :         011100    < RandomBits : bit (2) > >
    | < Single block MBMS access :     01111    < RandomBits : bit (3) > >;
    | < New Rach Type for PS Only capability : xxxxx < RandomBits : bit(3) > >;
```

TABLE 8

```
< EGPRS Packet channel request message content > ::=
    < One Phase Access Request :                          0        < MultislotClass : bit (5) >
                                                                   < Priority : bit (2) >
                                                                   < RandomBits : bit (3) > >
    | < Short Access Request :                           100       -- The value 100 was allocated in
an earlier version of the protocol and shall not be used by the mobile station
                                                                   < NumberOfBlocks : bit (3) >
                                                                   < Priority : bit (2) >
                                                                   < RandomBits : bit (3) > >
    | < One Phase Access Request by Reduced Latency MS: 101  < MultislotClassGroup : bit (3) >
                                                                   < Priority : bit (2) >
                                                                   < RandomBits : bit (3) > >
    | < Two Phase Access Request :                    110000      < Priority : bit (2) >
                                                                   < RandomBits : bit (3) > >
    | < Signalling :                                  110011      < RandomBits : bit (5) > >
    | < One phase Access Request in RLC unack mode : 110101       < RandomBits : bit (5) > >
    | < Dedicated Channel Request :                   110110      < RandomBits : bit (5) > >
    | < Emergency call :                              110111      < RandomBits : bit (5) > >;
    | < New Rach Type for PS Only capability :         xxxxxx     < RandomBits : bit(5) > >;
```

At step 554, the access network entity 104 allocates a single block to send a new PS mode class mark message in response to the packet channel request message. At step 556, the access network entity 104 sends the allocation information to the GERAN terminal 102. At step 558, the GERAN terminal 102 sends a PS mode class mark message indicating capability to support PS only services to the access network entity 104 over the allocated single block. At step 560, the access network entity 104 transmits a packet uplink assignment indicating resources allocated to the GERAN terminal 102. The resources allocated may include PDTCH or PACCH for PS only communication.

Figure 7:
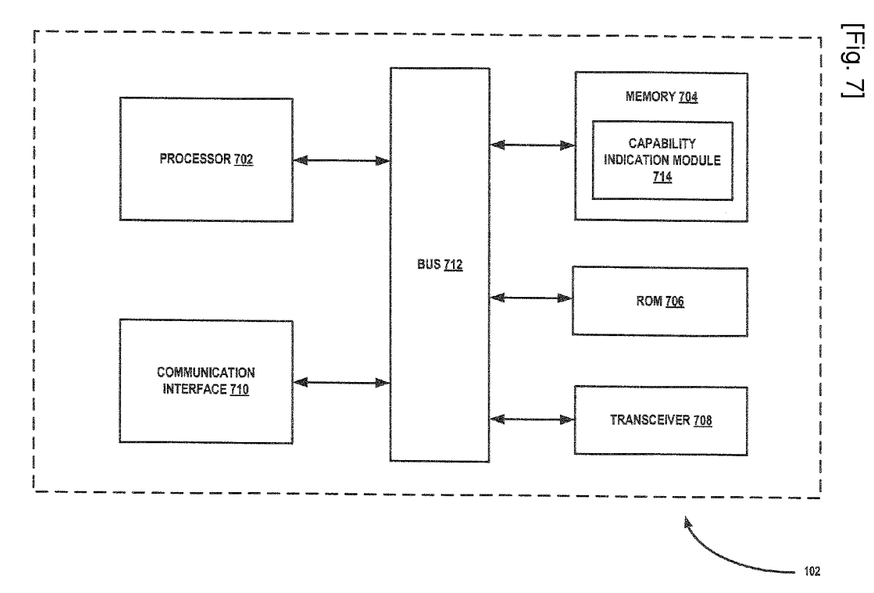
FIG. 7 illustrates a block diagram of a GERAN terminal, such as those shown in FIG. 1, showing various components for implementing embodiments of the present subject matter.

FIG. 7 illustrates a block diagram of a GERAN terminal 102, such as those shown in FIG. 1, showing various components for implementing embodiments of the present subject matter. In FIG. 7, the GERAN terminal 102 includes a processor 702, memory 704, a read only memory (ROM) 706, a transceiver 708, a communication interface 710, and a bus 712.

The processor 702, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 702 may also include embedded controllers, such as generic or programmable logic devices or arrays, application specific integrated circuits, single-chip computers, smart cards, and the like.

The memory 704 may be volatile memory and non-volatile memory. The memory 704 may include a PS capability indication module 714 for indicating capability to support PS only services to the access network entity 104 or the core network entity 106 when the GERAN terminal 102 supports only PS mode, according to the embodiments illustrated in FIGS. 1 to 6. A variety of computer-readable storage media may be stored in and accessed from the memory elements. Memory elements may include any suitable memory device(s) for storing data and machine-readable instructions such as read only memory, random access memory, erasable programmable read only memory, electrically erasable programmable read only memory, hard drive, removable media drive for handling memory cards, Memory Sticks™, and the like.

Embodiments of the present subject matter may be implemented in conjunction with modules including functions, procedures, data structures, and application programs, for performing tasks, defining abstract data types, or low-level hardware contexts. The PS capability indication module 714 may be stored in the form of machine-readable instructions on any of the above-mentioned storage media and is executable by the processor 702. For example, a computer program may include the machine-readable instructions capable for indicating capability to support PS only services to the access network entity 104 or the core network entity 106 when the GERAN terminal 102 supports only PS mode, according to the teachings and herein described embodiments of the present subject matter. The computer program may be included on a non-transitory computer-readable storage medium and loaded from the storage medium onto a hard drive in the non-volatile memory.

The transceiver 708 is configured for transmitting a PS only mode capability indication to the access network entity 104 or the core network entity 106 and receiving PS only services from the access network entity 104. The components such as the ROM 706, the communication interface 710, and the bus 712 are well known to the person skilled in the art and hence the explanation is thereof omitted.

The present embodiments have been described with reference to specific example embodiments, it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

The invention claimed is:

1. A method for providing only packet switched (PS) services by a global system for mobile communication (GSM) enhanced data rates for GSM evolution (EDGE) radio access network (GERAN) terminal in a GERAN environment, the method comprising:
    transmitting, to a GERAN entity, an indicator indicating a capability of the GERAN terminal to support only PS services to the GERAN entity in the GERAN environment and PS related capability information including power information and information about modulation and coding schemes for the PS services; and receiving PS only services data from the GERAN entity over resources suitable for PS data communication based on the indicator and the PS related capability information.

2. The method of claim 1, wherein transmitting of the indicator comprises:

receiving, from the GERAN entity, capability information of the GERAN entity;

determining whether the GERAN entity provides the PS services based on the capability information; and transmitting the indicator to the GERAN entity if the GERAN entity provides the PS services.

3. The method of claim 1, wherein the indicator is included in one of an attach request message, a routing area update request message and a packet resource request message.

4. The method claim 1, wherein transmitting of the indicator comprises:

transmitting the indicator to the GERAN entity according to a request of the GERAN entity.

5. The method of claim 1, wherein the GERAN entity is one of a plurality of GERAN entities that have transmitted information indicating a capability capable of providing the PS services.

6. The method of claim 1, wherein the indicator includes a bit value indicating that the GERAN terminal uses only the PS services.

7. The method of claim 1, wherein transmitting of the indicator comprises:

transmitting a packet channel request message to the GERAN entity;

receiving information about resources allocated for transmitting the indicator from the GERAN entity;

transmitting a PS mode class mark message including the indicator to the GERAN entity over the allocated resources; and receiving, from the GERAN entity, a resource allocating message including assignment information of resources for transmitting and receiving data related to the PS services.

8. The method of claim 1, wherein receiving of the PS services only data comprises:

receiving control information including information about resources assigned for the PS services from the GERAN entity; and receiving the data from the GERAN entity using resources based on the control information.

9. The method of claim 1, wherein the GERAN entity includes one of a core network entity and an access network entity.

10. An apparatus for providing only packet switched (PS) services by a global system for mobile communication (GSM) enhanced data rates for GSM evolution (EDGE), radio access network (GERAN) terminal in a GERAN environment, the apparatus comprising:

a processor configured to control a transceiver; and
a transceiver configured to:

transmit, to a GERAN entity, an indicator indicating a capability of the GERAN terminal to support only PS services to the GERAN entity in the GERAN environment and PS related capability information including power information and information about modulation and coding schemes for the PS services, and receive PS only services data from the GERAN entity based on the indicator and the PS related capability information.

11. The apparatus of claim 10, wherein, the processor is configured to:

control the transceiver to receive, from the GERAN entity, capability information of the GERAN entity;

determine whether the GERAN entity provides the PS services based on the capability information; and control the transceiver to transmit the indicator to the GERAN entity if the GERAN entity provides the PS services.

12. The apparatus of claim 10, wherein the indicator is included in one of an attach request message, a routing area update request message and a packet resource request message.

13. The apparatus claim 10, wherein the processor is configured to control the transceiver to transmit the indicator to the GERAN entity according to a request of the GERAN entity.

14. The apparatus of claim 10, wherein the GERAN entity is one of a plurality of GERAN entities that have transmitted information indicating a capability capable of providing the PS services.

15. The apparatus claim 10, wherein the indicator includes a bit value indicating that the GERAN terminal uses only the PS services.

16. The apparatus claim 10, wherein the transceiver is configured to:

transmit a packet channel request message to the GERAN entity;

receive information about resources allocated for transmitting the indicator from the GERAN entity;

transmit a PS mode class mark message including the indicator to the GERAN entity over the allocated resources; and receive, from the GERAN entity, a resource allocating message including assignment information of resources for transmitting and receiving data related to the PS services.

17. The apparatus of claim 10, wherein the transceiver is configured to receive control information including information about resources assigned for the PS services from the GERAN entity, and to receive the PS services only data from the GERAN entity using resources based on the control information.

18. The apparatus of claim 10, wherein the GERAN entity includes one of a core network entity and an access network entity.

* * * * *